Patented Sept. 18, 1951

2,568,011

UNITED STATES PATENT OFFICE 2,568,011

ARYLTHIOALKANOAMIDES AND THEIR PREPARATION

John A. King, Albany, and Freeman H. McMillan, Troy, N. Y., assignors, by mesne assignments, to Winthrop-Stearns Inc., New York, N. Y., a corporation of Delaware No Drawing. Application July 8, 1946, Serial No. 682,140

20 Claims. (Cl. 260—247.1)

This invention relates to processes for the production, by means of the Willgerodt reaction, of carboxylic acids and derivatives thereof from organic compounds substituted with aromatic nuclei bearing one or more reactive substituents. In particular it relates to processes for preparing thioamides from ketones containing aromatic radicals which are substituted with hydroxyl, amino, nitro and acylamino groups, by reaction with sulfur and morpholine.

It has been known that the Willgerodt reaction in one or more of its various forms can be carried out on compounds which contain aromatic nuclei substituted by stable groups, such as alkyl, halo, alkoxy and the like. This is disclosed in the prior U. S. applications of J. A. King, Ser. Nos. 607,671 (now U. S. Patent 2,456,785) and 607,672 (now abandoned), filed July 28, 1945, and 633,875 (now U. S. Patent 2,459,706), filed December 8, 1945. However, not until our discovery thereof has it been known that the Willgerodt reaction can be applied to such compounds wherein the aromatic nuclei may carry reactive groups, including hydroxyl, amino, nitro and acylamino.

We have discovered that aliphatic aromatic ketones wherein the aromatic radical is substituted by one or more reactive groups, as in the case of m-hydroxyacetophenone or p-aminopropiophenone, undergo the Willgerodt reaction to form in good yield the corresponding aryl-substituted aliphatic acids or amide derivatives thereof. For example m-hydroxyacetophenone, used as an illustration above, is converted by treatment with morpholine and sulfur to m-hydroxyphenylthioacetmorpholide and similarly p-aminopropiophenone is transformed to beta-(p-aminophenyl)thiopropionmorpholide. By the same procedure, resacetophenone is converted to 2,4-dihydroxyphenylthioacetmorpholide and p-gallacetophenone is converted to 2,4,5-trihydroxyphenylthioacetmorpholide. Our process is applicable to ketones containing in the aromatic nucleus several reactive substituent groups of the type herein disclosed. In practice we find that compounds containing in the aromatic nuclei 1 to 3 of such groups are suited to our processes.

Our invention is illustrated by the following general equation:

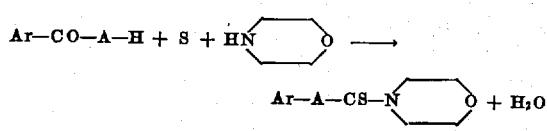

wherein Ar is a monocarbocyclicaryl radical bearing from one to three reactive nuclear substituents selected from the group consisting of hydroxyl, amino, acylamino and nitro radicals, and A is an alkylene radical of 1 to 4 carbon atoms.

Our discovery that the Willgerodt reaction may be carried out on compounds containing reactive substituents in the aromatic nuclei is contrary to all expectation, since the chemical literature leads one to believe that such reactions cannot be accomplished. Nowhere is there a report which indicates that these reactions are feasible. This is not surprising when the extremely vigorous and sometimes drastic conditions employed in the Willgerodt reaction are considered, and when thought is given to the deep-seated rearrangement of the organic compound that occurs. The compound is subjected to temperatures of at least 100° C. and generally about 200° C. in the presence of sulfur and an amine or ammonia, with or without added hydrogen sulfide and/or inert solvents such as water, primary alcohols, dioxane, or hydrocarbons. These mixtures are both oxidizing and reducing agents. Therefore, it is entirely contrary to expectation that compounds containing groups such as aromatic amino and phenolic groups, which compounds are known to be susceptible to oxidation even under mild conditions, will withstand the vigorous treatment applied. It is equally surprising that aromatic nitro groups, which are known to have high oxidation potentials, are not completely reduced under the conditions of the Willgerodt reaction.

The chemical reactions which we have discovered provide an excellent means for the production of aromatically-substituted aliphatic acids and thioamide derivatives thereof, wherein the aromatic nuclei are substituted with hydroxyl, amino, nitro and acylamino groups. Hitherto these acids and related compounds have been obtainable only by involved and costly chemical processes.

The compounds to which our proceses can be applied include all aryl lower alkyl ketones wherein the aryl nuclei bear one or more of the reactive substituents of the type discussed above. As is usual in the cases of the Willgerodt reaction, the yields of desired thioamide decrease as the length of the alkyl radical increases. Thus in general the best yields are obtained when the aryl methyl ketones are employed. However the aryl ethyl, aryl propyl and aryl butyl ketones undergo the reaction and practicable yields of the corresponding acid or derivative thereof can be isolated by the methods illustrated in the appended examples. The term lower alkyl is therefore used in this specification and the appended claims to mean alkyl radicals of 1 to 4 carbon atoms. Similarly, lower alkylene (designated hereinabove as A) means an alkylene radical of 1 to 4 carbon atoms. When the carboxylic acid is desired we have found it most efficient to hydrolyze the crude thioamide by heating with alkali or acid. The carboxylic acid is thereafter isolated from the hydrolysis mixture by alkaline extraction, evaporation, crystallization or the like.

The aryl nuclei of the aryl alkyl ketones can of course be also substituted by groups which are known to be stable under the conditions of the Willgerodt reaction. Thus, the aryl nucleus may contain besides the reactive groups disclosed herein, alkyl, aryl, alkoxy, alkylmercapto, halo and related groups.

The relative proportions of reactants which we prefer to use in our processes are in general 1 mole of compound to 2.5 moles of sulfur to 2 moles of morpholine. If the amount of sulfur is decreased to 2.25 moles or 2 moles, the yield of product decreases 5-10%. The use of more than 2.5 moles of sulfur does not increase the yield generally. In some experiments we have employed 1 mole of each of the reactants with success, albeit lower yields. If less than the theoretically required amount of sulfur is used low yields are encountered but the reaction still proceeds. The relative amount of morpholine used is less critical than the amount of sulfur. We have found that two moles of morpholine per mole of ketone provide the best results. However, one mole is satisfactory, although the yield is somewhat reduced. Similarly more than two moles of morpholine can be used with good results.

The reaction is generally complete after 1-2 hours at 100-150° C. With lower temperatures, time intervals up to 8-10 hours may be required.

Our invention is illustrated by the following examples, but is not limited in spirit or scope thereto.

Example 1

0.1 mole of o-hydroxyacetophenone, 0.25 mole of sulfur and 0.2 mole of morpholine are mixed and heated to reflux for 2 hours. The cooled mixture is taken up in chloroform and washed successively with an equal volume of water, sufficient dilute hydrochloric acid to remove excess morpholine, and finally with an equal volume of water. The chloroform is removed under vacuum and the residue of crude o-hydroxyphenylthioacetmorpholide is recrystallized from toluene; M. P. 160-161° C.; analysis: calcd., 5.91% N; found, 5.63% N. The o-hydroxyphenylthioacetmorpholide can be converted into o-hydroxyphenylacetic acid, M. P. 138-141° C., by refluxing the crude material for 2½ hours with 25% aqueous sodium hydroxide and subsequent acidification, in an overall yield of 59% from the starting substituted acetophenone.

By the same procedure, resacetophenone can be converted to 2,4 - dihydroxyphenylthioacetmorpholide and p-gallacetophenone can be converted to 3,4,5-trihydroxyphenylthioacetmorpholide.

Example 2 m-Hydroxyacetophenone is converted by the method of Example 1 into m-hydroxyphenylthioacetomorpholide, M. P. 97.5-98° C., after recrystallization from toluene; analysis: calcd., 5.91% N; found, 5.93% N. The m-hydroxyphenylthioacetmorpholide can be converted as in Example 1 into m-hydrophenylacetic acid, M. P 120-126° C., in a yield of 66% based on the starting ketone.

Example 3 p-Hydroxyacetophenone, when treated as in Example 1, forms p-hydroxyphenylthioacetmorpholide, M. P. 124.5-125.5° C.; analysis: calcd., 5.91% N; found, 5.92% N. It is readily converted into p-hydroxyphenylacetic acid of M. P. 145-148° C. by hydrolysis as in Example 1; yield from the starting substituted acetophenone, 50%.

Acetocatechol can be similarly transformed to 3,4-dihydroxyphenylthioacetmorpholide and the latter hydrolyzed to 3,4-dihydroxyphenylacetic acid of M. P. 124-127° C.

Example 4

A mixture of 0.5 mole of m-aminoacetophenone, 1.25 moles of sulfur and 1 mole of morpholine is refluxed 2 hours. The cooled reaction mixture is taken up in chloroform and washed twice with water. The chloroform is evaporated in vacuum and the residue of m-aminophenylthioacetmorpholide is recrystallized from ethanol, M. P. 129-130° C.; analysis: calcd., 11.86% N; found, 11.80% N.

The morpholide can be converted to m-aminophenylacetic acid by the following process. The crude morpholide is refluxed for 4 hours with 500 cc. of concentrated hydrochloric acid, the mixture is filtered, and the filtrate is taken to dryness under vacuum. The residue is treated with excess 35% caustic soda solution and evaporated to dryness under vacuum in order to remove retained morpholine. Then an excess of concentrated hydrochloric acid is added and the mixture is again taken to dryness. The residue is leached with 300 cc. of boiling absolute alcohol. The alcoholic extract is evaporated and the residue refluxed ½ hour with 500 cc. of concentrated hydrochloric acid. The acid is removed under vacuum and the residue is dried by azeotropic distillation with toluene. There is obtained thus m-aminophenylacetic acid hydrochloride, melting with decomposition at about 200° C. after recrystallization from absolute ethanol; analysis: calcd., 18.93% Cl; found, 18.84% Cl. The crude amino acid hydrochloride is treated with one equivalent of dilute sodium hydroxide solution. After decolorization there is obtained from the chilled solution a 61% yield of m-aminophenylacetic acid (calculated on the starting ketone), M. P. 144-146.5° C.

In the above procedure, ethyl m-aminophenylacetate hydrochloride can be obtained if the residue from the alcoholic leach liquor is not refluxed with hydrochloric acid. The ester hydrochloride can be obtained in 85% yield (calculated on the morpholide), M. P. 126-127° C. after recrystallization from ethanol-ether; analysis: calcd., 16.46% Cl; found, 16.23% Cl.

Example 5

1 mole of m-aminoacetophenone, 1 mole of sulfur, and 1 mole of morpholine are refluxed for 8 hours, then poured into water and extracted with ether. From the ether solution is obtained a 38% yield of m-aminoacetmorpholide of M. P. 130-130.5° C. after two recrystallizations from ethanol.

Example 6 p-Aminoacetophenone is converted by the method of Example 4 to p-aminophenylthioacetmorpholide, M. P. 77.5–79° C., after recrystallization from a mixture of toluene and petroleum ether (B. P. 90–100° C.); analysis: calcd., 11.86% N; found, 11.76% N.

The morpholide can be hydrolyzed by the method of Example 4 to p-aminophenylacetic acid hydrochloride, which after recrystallization from water and then ethanol melts with decomposition over the range of 215–240° C.; analysis: calcd., 18.93% Cl; found, 18.64% Cl. The acid hydrochloride is converted to the free acid by treatment with one equivalent of alkali and sufficient water for solution at the boiling point (1500 cc. of solution for 61 g. of acid hydrochloride). After decolorization there is obtained a 51% yield (based on p-aminoacetophenone) of p-aminophenylacetic acid of M. P. 196–197° C.

Example 7

1 mole of m-acetamidoacetophenone, 2.5 moles of sulfur and 1 mole of morpholine are refluxed for 2 hours. The mixture is chilled and dissolved in chloroform. The washed chloroform solution is evaporated and the residue of m-acetamidophenylthioacetmorpholide is recrystallized from ethanol; M. P. 158.5–159° C.; analysis: calcd., 10.07% N; found, 10.08% N.

The morpholide is readily hydrolyzed by the procedure given in Example 4 to give a 68% overall yield of p-aminophenylacetic acid, M. P. 144–146.5° C.

Example 8 p-Acetamidoacetophenone can be converted to p-acetamidophenylthioacetmorpholide, M. P. 132.5–133° C., by the method disclosed in Example 7. The morpholide can be hydrolyzed by the procedure of Example 4 and a 70% yield (based on the starting ketone) of p-aminophenylacetic acid is obtained, M. P. 196–197° C.

Example 9

2 moles of o-acetamidoacetophenone, 5 moles of sulfur and 4 moles of morpholine are refluxed 1 hour. The reaction mixture is worked up as in Example 7 and o-acetamidophenylthioacetmorpholide of M. P. 161.5–162.5° C. is obtained after three recrystallizations from absolute ethanol; analysis; calcd., 10.07% N; found, 9.45% N.

The thiomorpholide is refluxed in excess concentrated hydrochloric acid for 3 hours and the mixture chilled and extracted twice with ether. Removal of the solvent gives crystalline oxindole melting at 122–123° C.

Example 10

A mixture of 0.1 mole of m-nitroacetophenone, 0.25 mole of sulfur and 0.2 mole of morpholine is refluxed 1 hour. The cooled mixture is taken up in chloroform and washed successively with water, dilute hydrochloric acid and water. Removal of the chloroform results in a 30% yield of m-nitrophenylthioacetmorpholide, M. P. 138.5–139.5° C. after recrystallization from absolute ethanol; analysis: calcd., 10.25% N; found, 10.89% N.

Example 11

0.1 mole of m-acetoxyacetophenone (M. P. 44–44.5° C.; prepared by acetylation of m-hydroxyacetophenone), refluxed for 2 hours with 0.25 mole of sulfur and 0.2 mole of morpholine, is converted to 20 g. of crude m-hydroxyphenyl- thioacetmorpholide of M. P. 90–94° C. The morpholide is isolated by dissolving the reaction mixture in 100 cc. of chloroform, washing successively with water, dilute hydrochloric acid and water, extracting with 150 cc. of 8% sodium hydroxide solution, acidifying the alkali extract with dilute acid, extracting the resulting mixture with chloroform, and evaporating the solvent to obtain the desired morpholide. Recrystallization from toluene gives a 38% yield of pure morpholide of M. P. 94–95° C., identical with an authentic sample of m-hydroxyphenylthioacetmorpholide.

We claim:

1. A compound having the formula

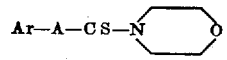

where Ar is a monocarbocyclic aryl radical bearing from 1 to 3 reactive nuclear substituents selected from the group consisting of hydroxyl, amino, acylamino and nitro radicals and A is an alkylene radical of 1 to 4 carbon atoms.

2. A compound having the formula

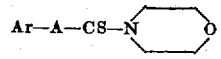

where Ar is a monocarbocyclic aryl radical bearing from 1 to 3 hydroxyl groups and A is an alkylene radical of 1 to 4 carbon atoms.

3. A compound having the formula

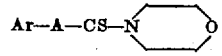

where Ar is a monocarbocyclic aryl radical bearing from 1 to 3 amino groups and A is an alkylene radical of 1 to 4 carbon atoms.

4. A compound having the formula

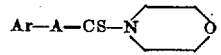

where Ar is a monocarbocyclic aryl radical bearing from 1 to 3 acylamino groups and A is an alkylene radical of 1 to 4 carbon atoms.

5. A compound having the formula

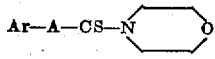

where Ar is a monocarbocyclic aryl radical bearing from 1 to 3 nitro groups and A is an alkylene radical of 1 to 4 carbon atoms.

6. m-Hydroxyphenylthioacetmorpholide, existing as colorless crystals melting at 97.5–98° C.

7. The process for preparing a compound having the formula

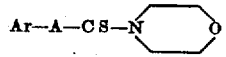

which comprises heating with sulfur and morpholine a ketone having the formula

where Ar is a monocarbocyclic aryl radical bearing from 1 to 3 reactive nuclear substituents selected from the group consisting of hydroxyl, amino, acylamino and nitro radicals and A is a lower alkylene group of 1 to 4 carbon atoms.

8. The process of producing a compound having the formula

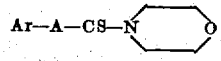

which comprises heating with sulfur and morpholine a ketone having the formula

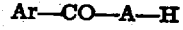

where Ar is a monocarbocyclic aryl radical bearing from 1 to 3 hydroxyl groups and A is a lower alkylene group of 1 to 4 carbon atoms.

9. The process of producing a compound having the formula

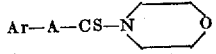

which comprises heating with sulfur and morpholine a ketone having the formula

Ar—CO—A—H where Ar is a monocarbocyclic aryl radical bearing from 1 to 3 amino groups and A is a lower alkylene group of 1 to 4 carbon atoms.

10. The process of producing a compound having the formula

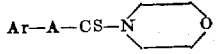

which comprises heating with sulfur and morphorine a ketone having the formula

Ar—CO—A—H where Ar is a monocarbocyclic aryl radical bearing from 1 to 3 acylamino groups and A is a lower alkylene group of 1 to 4 carbon atoms.

11. The process of producing a compound having the formula

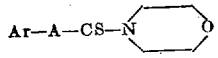

which comprises heating with sulfur and morpholine a ketone having the formula

Ar—CO—A—H where Ar is a monocarbocyclic aryl radical bearing from 1 to 3 nitro groups and A is a lower alkylene group of 1 to 4 carbon atoms.

12. The process of producing a compound having the formula, HO—C$_6$H$_4$—A—CS—NC$_4$H$_8$O, which comprises heating with morpholine and sulphur a ketone having the formula

HO—C$_6$H$_4$—CO—A—H where A is a lower alkylene group.

13. A hydroxyphenylthioacetmorpholide.
14. An aminophenylthioacetmorpholide.
15. An acylaminophenylthioacetmorpholide.
16. A nitrophenylthioacetmorpholide.

17. The process of producing a hydroxyphenylthioacetmorpholide which comprises heating a hydroxyacetophenone with sulfur and morpholine.

18. The process of producing an aminophenylthioacetmorpholide which comprises heating an aminoacetophenone with sulfur and morpholine.

19. The process of producing an acylaminophenylthioacetmorpholide which comprises heating an acylaminoacetophenone with sulfur and morpholine.

20. The process of producing a nitrophenylthioacetmorpholide which comprises heating a nitroacetophenone with sulfur and morpholine.

JOHN A. KING.
FREEMAN H. McMILLAN.

REFERENCES CITED

The following references are of record in the file of this patent:

UNITED STATES PATENTS

| Number | Name | Date |
|---|---|---|
| 2,358,925 | Haller | Sept. 26, 1944 |

OTHER REFERENCES

J. A. C. S., 64, page 3051 (1942).
Jour. Economic Entomology 37, 843–844 (1944).
Chemical Abstracts, vol. 39, (1945), page 2065 citing Jour. S. African Chem. Inst., 27, 15–13 (1944).
Organic Reactions, vol. III, p. 89, edited by R. Adams, published (1946) by John Wiley and Sons, Inc.

Certificate of Correction

Patent No. 2,568,011 September 18, 1951

JOHN A. KING ET AL.

It is hereby certified that error appears in the printed specification of the above numbered patent requiring correction as follows:

Column 1, line 42, for "2,4,5-" read *3,4,5-*; column 2, line 1, for "monocarbocyclicaryl" read *monocarbocyclic aryl*; line 44, for "proceses" read *processes*; column 5, line 68, for "10.25%" read *10.52%*; column 7, lines 20 and 21, for "morphorine" read *morpholine*;

and that the said Letters Patent should be read as corrected above, so that the same may conform to the record of the case in the Patent Office.

Signed and sealed this 1st day of January, A. D. 1952.

[SEAL]

THOMAS F. MURPHY,
*Assistant Commissioner of Patents.*